United States Patent
Kim et al.

(10) Patent No.: US 10,275,849 B2
(45) Date of Patent: Apr. 30, 2019

(54) IMAGE PROCESSING METHOD AND APPARATUS FOR PERFORMING TWO-DIMENSIONAL FAST FOURIER TRANSFORM WITH RESPECT TO IMAGE DATA

(71) Applicant: SAMSUNG ELECTRONICS CO., LTD., Suwon-si (KR)

(72) Inventors: Hojung Kim, Suwon-si (KR); Yongkyu Kim, Hwaseong-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/429,721

(22) Filed: Feb. 10, 2017

(65) Prior Publication Data

US 2018/0060997 A1     Mar. 1, 2018

(30) Foreign Application Priority Data

Aug. 31, 2016  (KR) .......................... 10-2016-0111683

(51) Int. Cl.
| | |
|---|---|
| *G06K 9/40* | (2006.01) |
| *G06K 9/76* | (2006.01) |
| *G06T 1/20* | (2006.01) |
| *G06T 5/10* | (2006.01) |

(Continued)

(52) U.S. Cl.
CPC .............. *G06T 1/20* (2013.01); *G03H 1/0808* (2013.01); *G06F 17/142* (2013.01); *G06T 5/10* (2013.01); *G06T 2200/28* (2013.01); *G06T 2207/10004* (2013.01); *G06T 2207/10028* (2013.01); *G06T 2207/20056* (2013.01)

(58) Field of Classification Search
None
See application file for complete search history.

(56) References Cited

U.S. PATENT DOCUMENTS

| | | |
|---|---|---|
| 5,089,982 A | 2/1992 | Gran et al. |
| 2008/0028013 A1 | 1/2008 | Kamegawa et al. |

(Continued)

FOREIGN PATENT DOCUMENTS

| | | |
|---|---|---|
| JP | 2004-206254 A | 7/2004 |
| JP | 2010-169970 A | 8/2010 |

(Continued)

OTHER PUBLICATIONS https://www.mathworks.com/discovery/matlab-multicore.html, Aug. 30, 2018.*

(Continued)

*Primary Examiner* — Randolph I Chu
(74) *Attorney, Agent, or Firm* — Sughrue Mion, PLLC

(57) ABSTRACT

An image processing apparatus configured to perform a two-dimensional (2D) fast Fourier transform (FFT) with respect to image data includes a first core and a second core, each of the first core and the second core including a plurality of processors configured to perform a one-dimensional (1D) FFT; and a controller configured to control the first core and the second core to perform a primary two-dimensional (2D) FFT and a secondary 2D FFT with respect to the image data by repeatedly performing the 1D FFT.

13 Claims, 10 Drawing Sheets

(51) Int. Cl.
*G06F 17/14* (2006.01)
*G03H 1/08* (2006.01)

(56) References Cited

U.S. PATENT DOCUMENTS

| | | | |
|---|---|---|---|
| 2009/0219380 A1* | 9/2009 | Cable | G03H 1/0808 348/40 |
| 2011/0107060 A1* | 5/2011 | McAllister | G06F 17/142 712/22 |
| 2014/0327566 A1* | 11/2014 | Burgio | G01S 13/72 342/108 |
| 2016/0041524 A1 | 2/2016 | Song et al. | |
| 2017/0091916 A1 | 3/2017 | Kim et al. | |

FOREIGN PATENT DOCUMENTS

| | | |
|---|---|---|
| JP | 2012-018545 A | 1/2012 |
| KR | 10-1366116 B1 | 2/2014 |
| KR | 10-2014-0125608 A | 10/2014 |
| KR | 10-2016-0017489 A | 2/2016 |

OTHER PUBLICATIONS

Communication dated Feb. 20, 2018 issued by the European Patent Office in counterpart European Application No. 17184395.6.
Antonin Gilles et al., "Fast generation of complex modulation video holograms using temporal redundancy compression and hybrid point-source/wave-field approaches", Visual Communications and Image Processing, vol. 9599, Sep. 22, 2015, 14 pages total, XP060060860.
Tristan Colomb et al., "Numerical parametric lens for shifting magnification, and complete aberration compensation in digital holographic microscopy", Journal of the Optical Society of America, vol. 23, No. 12, Dec. 1, 2006, 14 pages total, XP007901432.

* cited by examiner

IMAGE PROCESSING METHOD AND APPARATUS FOR PERFORMING TWO-DIMENSIONAL FAST FOURIER TRANSFORM WITH RESPECT TO IMAGE DATA

CROSS-REFERENCE TO RELATED APPLICATION

This application priority from Korean Patent Application No. 10-2016-0111683, filed on Aug. 31, 2016 in the Korean Intellectual Property Office, the disclosure of which is incorporated herein in its entirety by reference.

BACKGROUND

1. Field

Methods and apparatuses consistent with exemplary embodiments disclosed herein relate to image processing.

2. Description of the Related Art

Recently, much research has been conducted on three-dimensional (3D) image-related techniques. Also, devices for implementing high-quality holograms in real time by using a complex spatial modulator (SLM) capable of controlling the amplitude and phase of light at the same time have been studied actively.

Computer-generated holograms (CGH) are used to reproduce holographic moving images, and an image processing apparatus calculates hologram values corresponding to positions on a hologram plane, which requires a huge amount of computational power. That is, the image processing apparatus needs to perform a Fourier transform once to express a point in a space, and has to perform a Fourier transform as many times as the number of pixels to express an image in the space.

An image processing apparatus such as a television (TV), a mobile device, etc., may process image data to reproduce holographic images. In this case, the image processing apparatus performs a Fourier transform with respect to image data and reproduces an image based on the transformed data.

When the image processing apparatus performs the Fourier transform, the computational amount is quite large and much time is required. In particular, as a portable device such as a mobile device has a limited size and power, there is a need for methods for reducing the computational amount and time for performing a Fourier transform.

SUMMARY

Exemplary embodiments provide a method and apparatus for performing a Fourier transform with respect to image data.

According to an aspect of an exemplary embodiment, there is provided an image processing apparatus configured to perform a two-dimensional (2D) fast Fourier transform (FFT) with respect to image data, the image processing apparatus including: a first core and a second core, each of the first core and the second core including a plurality of processors configured to perform a one-dimensional (1D) FFT; a memory configured to store data output from the first core and the second core; and a controller configured to control the first core and the second core to perform a primary two-dimensional (2D) FFT and a secondary 2D FFT with respect to the image data by repeatedly performing the 1D FFT.

The image processing apparatus may further include a plurality of operators configured to perform a focus term operation and a depth summation operation with respect to primary 2D FFT-transformed image data generated by the primary 2D FFT, to generate depth-summed image data, and the controller may be configured to input the depth-summed image data to the second core.

The image processing apparatus may further include: a plurality of operators configured to perform a focus term operation and a depth summation operation with respect to primary 2D FFT-transformed image data generated by the primary 2D FFT, to generate depth-summed image data, wherein the controller may be configured to store the depth-summed image data in the memory, read the depth-summed data from the memory, and input the read data to the first core.

The first core may be configured to alternately perform the primary 2D FFT with respect to a current frame of the image data and the secondary 2D FFT with respect to the current frame.

The second core may be configured to alternately perform the primary 2D FFT with respect to a current frame of the image data and the secondary 2D FFT with respect to the current frame.

The first core may be configured to perform the 1D FFT in a row direction, and the second core may be configured to perform the 1D FFT in a column direction.

The first core may be configured to perform the 1D FFT in a column direction, and the second core may be configured to perform the 1D FFT in a row direction.

According to an aspect of another exemplary embodiment, there is provided an image processing method of performing a 2D fast Fourier transform (FFT) with respect to image data, the image processing method including: performing, by a first core and a second core, a primary 2D FFT with respect to the image data to generate primary 2D FFT-transformed data; performing a focus term operation and a depth summation operation with respect to the primary 2D FFT-transformed data to generate depth-summed data; and performing, by the first core and the second core, a secondary 2D FFT with respect to the depth-summed data.

The performing of the 2D FFT may include: inputting the depth-summed data to the second core, performing a 1D FFT with respect to the depth-summed data to generate 1D FFT-transformed data, and outputting the 1D FFT-transformed data; storing the 1D FFT-transformed data output from the second core in a memory; and reading the stored data from the memory, inputting the read data to the first core, and performing the 1D FFT with respect to the input data.

The performing of the 2D FFT may include: storing the depth-summed data in a memory; reading the depth-summed data from the memory, inputting the read data to the first core, performing a 1D FFT with respect to the input data to generate 1D FFT-transformed data, and outputting the 1D FFT-transformed data; storing the 1D FFT-transformed data output from the first core in a memory; and reading the stored data from the memory, inputting the read data to the second core, and performing the 1D FFT with respect to the input data.

The image processing method may further include alternately performing, by the first core, the primary 2D FFT with respect to a current frame of the image data and the secondary 2D FFT with respect to the current frame.

The image processing method may further include alternately performing, by the second core, the primary 2D FFT with respect to a current frame of the image data and the secondary 2D FFT with respect to the current frame.

The first core may perform a 1D FFT in a row direction, and the second core may perform the 1D FFT in a column direction.

The first core may perform a 1D FFT in a column direction, and the second core may perform the 1D FFT in a row direction.

According to an aspect of another exemplary embodiment, there is provided a non-transitory computer-readable recording medium having recorded thereon a program which, when executed, causes an image processing apparatus to perform an image processing method according to an aspect of an exemplary embodiment.

BRIEF DESCRIPTION OF THE DRAWINGS

The above and/or other aspects will become apparent and more readily appreciated from the following description of the exemplary embodiments, taken in conjunction with the accompanying drawings in which.

DETAILED DESCRIPTION

Figure 1:
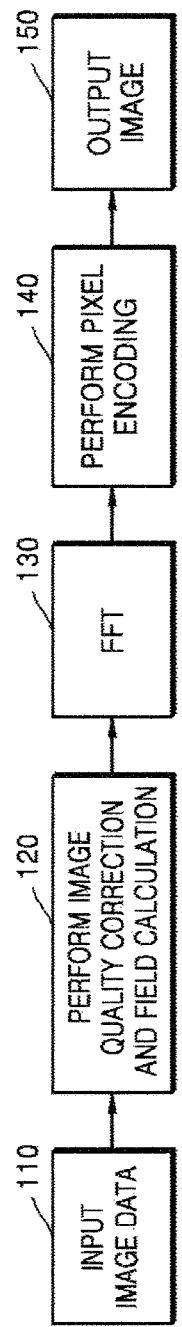
FIG. 1 is a flowchart illustrating a process of processing image data according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

Hereinafter, exemplary embodiments will be described in detail with reference to the accompanying drawings.

FIG. 1 is a flowchart illustrating a process of processing image data according to an exemplary embodiment. Referring to FIG. 1, an image processing apparatus may receive image data and output an image.

In operation 110, the image processing apparatus may receive image data. In an exemplary embodiment, when a layer-based algorithm is applied to image data in computer-generated holography (CGH) computation, the image data may include color data (or color images), depth data (or depth images), and the like. The color data may indicate a plurality of colors for each plane. In an exemplary embodiment, the color data may include a red image, a blue image, and a green image. A layer-based algorithm is used to divide a reproduction region of a hologram according to a depth and process data of each plane obtained by the division. The image processing apparatus may perform a Fourier transform or an inverse Fourier transform with respect to data of each plane obtained by the division and may generate a holographic image.

In operation 120, the image processing apparatus may perform image-quality correction and field calculation. The image processing apparatus may correct the image data to improve the quality of the image data.

In operation 130, the image processing apparatus may perform a Fourier transform or a fast Fourier transform (FFT). In an exemplary embodiment, the image processing apparatus may perform a Fourier transform with respect to image data in a two-dimensional (2D) matrix form. The image processing apparatus may perform a one-dimensional (1D) Fourier transform twice for a 2D Fourier transform. The image processing apparatus may perform a 1D Fourier transform with respect to image data in a row direction and may perform a 1D Fourier transform with respect to the transformed image data in a column direction. The image processing apparatus may generate a holographic image through a Fourier transform.

The image processing apparatus may include a plurality of cores which perform a Fourier transform with respect to the image data in parallel. For example, the image processing apparatus may allocate image data of each plane to a plurality of cores which may perform a Fourier transform with respect to the allocated image data.

The process of performing a Fourier transform with respect to image data by the image processing apparatus will be described in detail with reference to FIGS. 2 and 3 according to an exemplary embodiment.

In operation 140, the image processing apparatus may perform pixel encoding. The image processing apparatus may generate data to be input to a screen through pixel encoding.

In operation 150, the image processing apparatus may output an image to an image display apparatus.

In operation 140, the image processing apparatus may perform a Fourier transform with respect to a part of data which requires many calculations, thereby reducing the computational amount. The image processing apparatus may store a part of data in operation 140, thus reducing the amount of data stored in a memory.

The image processing apparatus may generate one new frame by combining a color frame with a depth frame. The image processing apparatus may alternately dispose a line of the color frame and a line of the depth frame.

The image processing apparatus may process image data and depth data line-by-line to reduce the number of frames stored in an external memory.

Figure 2:
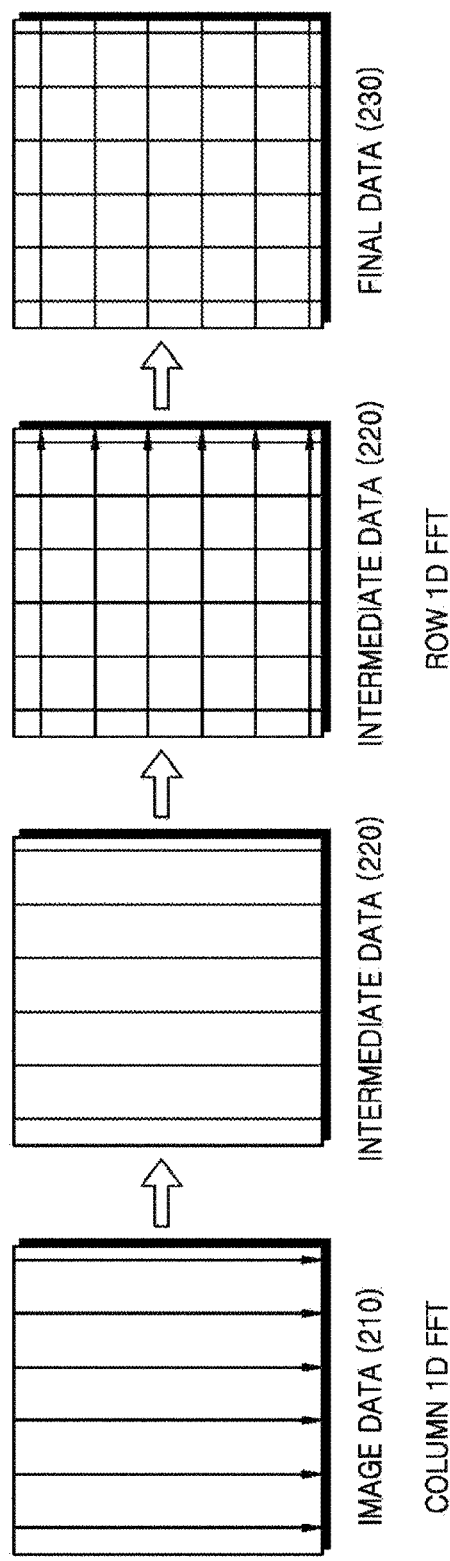
FIG. 2 is a flowchart illustrating a process of transforming data according to an exemplary embodiment.

FIG. 2 is a flowchart illustrating a process of transforming data according to an exemplary embodiment. Referring to FIG. 2, the image processing apparatus or a Fourier transform apparatus may perform a 1D FFT with respect to image data 210 twice and may generate final data 230 (also referred to as primary 2D FFT). In an exemplary embodiment, the image processing apparatus may perform a 1D FFT with respect to the image data 210 once in a column direction to generate intermediate data 220, and may perform a 1D FFT with respect to the intermediate data 220 in a row direction to generate the final data 230. Secondary 2D FFT may also be performed by performing the 1D FFT twice. The primary 2D FFT may be a FFT from a pupil to a retina, and the secondary 2D FFT may be a FFT from a panel to the pupil.

The primary 2D FFT and the secondary 2D FFT may have orders of performing 1D FFT that are reverse with respect to each other. For example, if the 1D FFT is performed twice in the column direction and then in the row direction when the primary 2D FFT is performed, the 1D FFT may be performed twice in the row direction and then in the column direction when the secondary 2D FFT is performed.

In FIG. 2, an example has been described in which the image processing apparatus performs the 1D FFT first in the column direction. On the other hand, in FIG. 3, an example will be described in which the image processing apparatus performs the 1D FFT first in the row direction.

Figure 3:
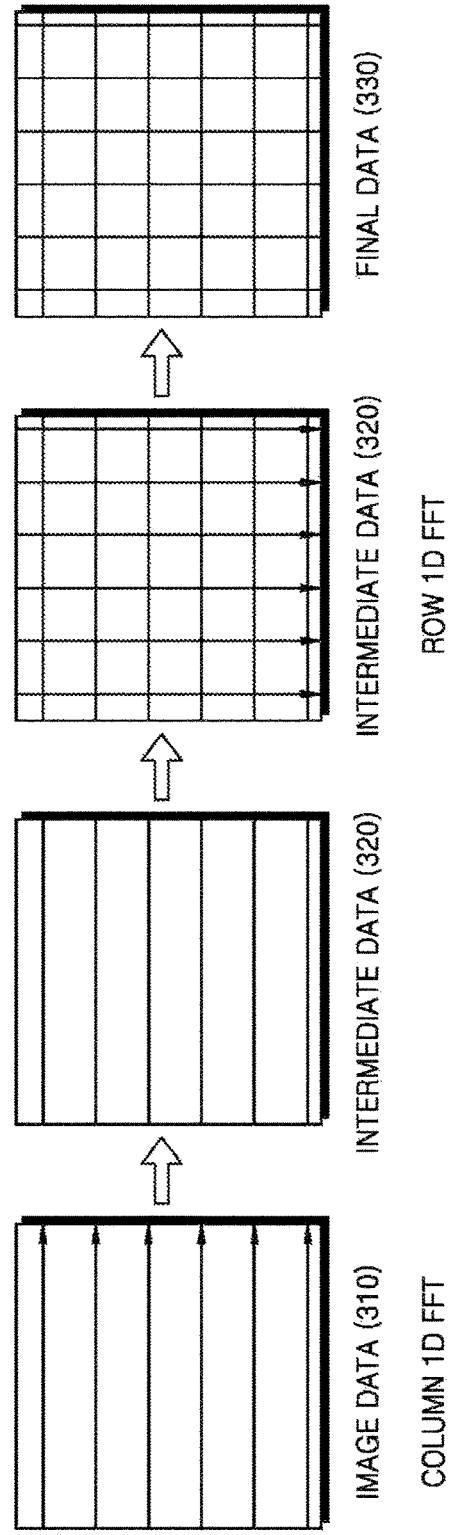
FIG. 3 is a flowchart illustrating a process of transforming data according to another exemplary embodiment.

FIGS. 2 and 3 illustrate a case in which the primary 2D FFT is performed. The secondary 2D FFT may also be performed identically to the primary 2D FFT or in orders of the row direction and the column direction, which are reverse to the primary 2D FFT.

The image processing apparatus performs the 1D FFT with respect to the image data 210 in the column direction. The intermediate data 220 indicates a result of performing the 1D FFT with respect to the image data 210 in the column direction. An arrow expressed in the image data 210 indicates a direction in which the image processing apparatus performs the 1D FFT. A straight line expressed in the intermediate data 220 indicates a direction in which the image data 210 is transformed.

The image processing apparatus reads the stored intermediate data 220 from the memory and performs the 1D FFT with respect to the intermediate data 220 in the row direction. The image processing apparatus may read the intermediate data 220 in the row direction from the memory and output the read intermediate data 220 to each 1D FFT processor.

The image processing apparatus performs the 1D FFT with respect to the intermediate data 220 in the row direction and generates the final data 230. The final data 230 is a result of performing the 1D FFT with respect to the image data 210 in the column direction and in the row direction.

FIG. 3 is a flowchart illustrating a process of transforming data according to another exemplary embodiment. Referring to FIG. 3, the image processing apparatus or the Fourier transform apparatus performs the 1D FFT with respect to the image data 310 twice and generates the final data 330. For example, the image processing apparatus may perform the 1D FFT with respect to the image data 310 once in the row direction to generate intermediate data 320, and may perform the 1D FFT with respect to the intermediate data 320 in the column direction to generate the final data 330. In FIGS. 2 and 3, the orders of the column and the row are reversed, and matters applied in FIG. 2 may be identically applied to FIG. 3.

Figure 4:
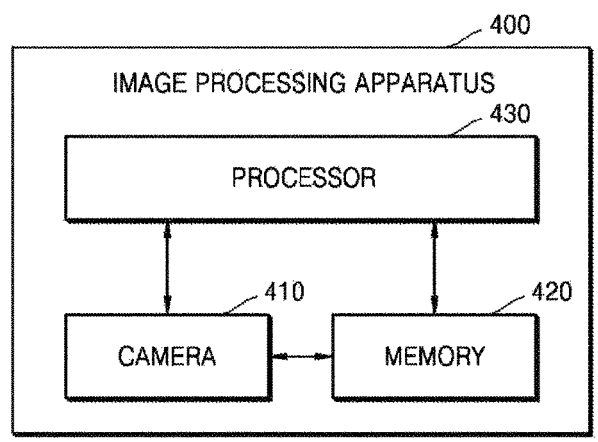
FIG. 4 is a block diagram of an image processing apparatus according to an exemplary embodiment.

FIG. 4 is a block diagram of an image processing apparatus according to an exemplary embodiment. Referring to FIG. 4, an image processing apparatus 400 may include a camera 410, a processor 430, and a memory 420. The image processing apparatus 400 may be an electronic device such as a computer, a mobile device, a display device, a wearable device, a digital camera, etc., or a central processing unit (CPU), a graphic processing unit (GPU), or the like.

The camera 410 captures an image and obtains a color image and a depth image. The color image and the depth image are obtained in the unit of a frame. The color image may include a red image, a green image, and a blue image. Each of the red image, the green image, and the blue image is one frame. The depth image is obtained for each color. That is, the camera 410 obtains a depth image for the red image, a depth image for the green image, and a depth image for the blue image. The depth image for each color is also one frame.

The processor 430 generates a frame in which a frame of the color image and a frame of the depth image are combined. The combined frame may be one frame. For example, the processor 430 may generate a first frame by combining the red image with the depth image for the red image, a second frame by combining the green image with the depth image for the green image, and a third frame by combining the blue image with the depth image for the blue image.

The memory 420 stores the color images and the depth images. The memory 420 stores the frames generated by the processor 430.

Figure 5:
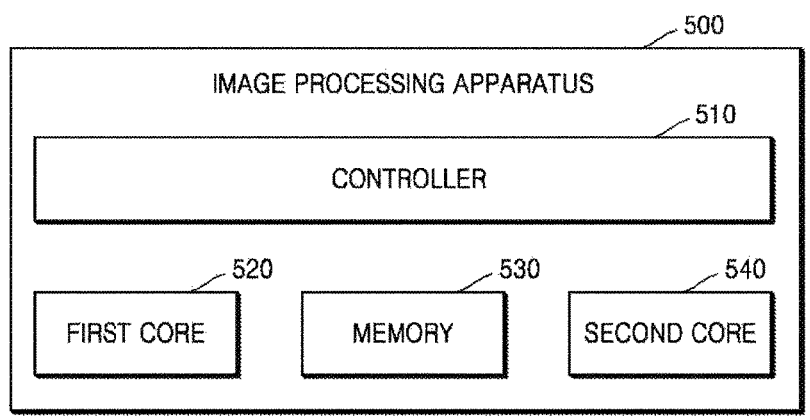
FIG. 5 is a block diagram of an image processing apparatus according to another exemplary embodiment.

FIG. 5 is a block diagram of an image processing apparatus according to another exemplary embodiment. An image processing apparatus 500 may be a mobile device, a display device, a wearable device, a CPU, a GPU, or the like.

The image processing apparatus 500 may include a controller 510, a first core 520, a memory 530, and a second core 540. The memory 530 may be a dynamic random access memory (DRAM) or a synchronous random access memory (SRAM).

The controller 510 controls the first core 520, the memory 530, the second core 540, and so forth. The controller 510 determines data input to the first core 520 and the second core 540. The controller 510 designates an operation to be performed by the first core 520 and the second core 540. For example, the controller 510 may control the first core 520 to perform the 1D FFT in the row direction and the second core 540 to perform the 1D FFT in the column direction. The controller 510 stores data generated during Fourier transform in the memory 530.

The controller 510 controls the first core 520 and the second core 540 to perform the primary 2D FFT and the secondary 2D FFT with respect to image data. The primary 2D FFT includes performing the 1D FFT twice and the secondary 2D FFT includes performing the 1D FFT twice. The controller 510 may control data input to the first core 520 and the second core 540 to perform the 2D FFT twice (e.g., to perform the primary 2D FFT and the secondary 2D FFT). The controller 510 controls a data flow such that the first core 520 and the second core 540 perform the secondary 2D FFT after performing the primary 2D FFT. Thus, the image processing apparatus 500 may perform the primary 2D FFT and the secondary 2D FFT (e.g., perform the 1D FFT a total of four times) by using the two cores 520 and 540. For example, the controller 510 may input the primary 2D FFT-transformed data to the first core 520 and input data output from the first core 520 to the second core 540 for the secondary 2D FFT. The controller 510 may input the primary 2D FFT-transformed data to the second core 540 and input data output from the second core 540 to the first core 520 for the secondary 2D FFT. Once the primary 2D FFT-transformed data is input to the second core 540, a process of storing and reading the primary 2D FFT-transformed data in and from the memory 530 may be omitted.

The first core 520 performs a Fourier transform with respect to data included in each line of a frame. For example, the first core 520 may perform the 1D FFT with respect to a frame in the row direction. One row or one column may be referred to as one line. When the first core 520 performs the 1D FFT with respect to the frame in the row direction, this refers to an operation by which the first core 520 performs the 1D FFT with respect to pixel values included in each row of the frame.

The first core 520 outputs the data to the memory 530. The first core 520 outputs a result of performing the 1D FFT to the memory 530 each time when the result is generated.

The first core 520 may include a plurality of 1D FFT processors. The plurality of 1D FFT processors may perform the 1D FFT with respect to each line of the frame. For example, the number of 1D FFT processors included in the first core 520 may be a divisor of the number of total rows of the frame. If the number of rows (lines) of the frame is 512, the first core 520 may include 8, 16, 32, or 64 1D FFT processors. If the first core 520 includes 8 1D FFT processors, the first core 520 may perform the 1D FFT with respect to 8 lines at the same time.

The memory 530 may store and output data. The memory 530 may be a DRAM or a SRAM.

The second core 540 may perform the 1D FFT with respect to data. The second core 540 may include a plurality of 1D FFT processors. The plurality of 1D FFT processors may perform the 1D FFT with respect to each column of the frame. For example, the number of 1D FFT processors included in the second core 540 may be a divisor of the number of total columns of the frame. If the number of columns of the frame is 1024, the second core 540 may include 8, 16, 32, or 64 1D FFT processors. If the second core 540 includes 8 1D FFT processors, the second core 540 may perform the 1D FFT with respect to 8 columns at the same time.

Figure 6:
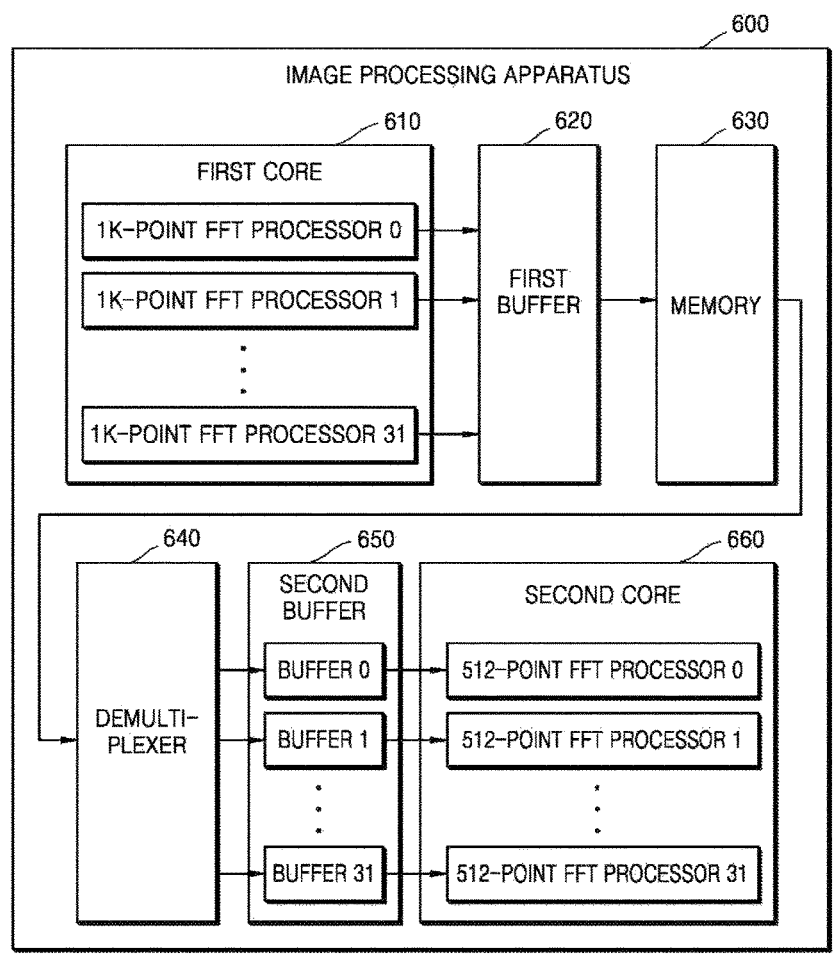
FIG. 6 is a block diagram of an image processing apparatus according to an exemplary embodiment.

FIG. 6 is a block diagram of an image processing apparatus according to an exemplary embodiment. Referring to FIG. 6, an image processing apparatus 600 may include a first core 610, a first buffer 620, a memory 630, a demultiplexer 640, a second buffer 650, and a second core 660.

With reference to FIG. 6, a case will be described as an example in which a frame size is 1K×512. In other words, when the size of a frame is 1K×512, one line of the frame includes 1K pixel values and the frame includes a total of 512 rows. That is, the frame includes 1K columns and 512 rows. Thus, the 1D FFT processors included in the first core 610 are 1K-point FFT processors, and the 1D FFT processors included in the second core 660 are 512-point FFT processors. The 1K-point FFT processors perform a Fourier transform with respect to 1024 pixel values, and the 512-point FFT processors perform a Fourier transform with respect to 512 pixel values. The number of processors included in each of the first core 610 and the second core 660 may vary with an input frame.

The first core 610 may include a plurality of 1K-point FFT processors. The plurality of 1K-point FFT processors may perform the 1D FFT with respect to each line of the frame. For example, the first core 610 may include 32 1K-point FFT processors. A 1K-point FFT processor 0 indicates a $0^{th}$ processor, a 1K-point FFT processor 1 indicates a $1^{st}$ processor, and a 1K-point FFT processor 31 indicates a $31^{st}$ processor. The 1K-point FFT processor 0 performs a Fourier transform with respect to a first line (or a first row) of the frame, the 1K-point FFT processor 1 performs a Fourier transform with respect to a second line of the frame, and the 1K-point FFT processor 31 performs a Fourier transform with respect to a $32^{nd}$ line of the frame.

The 1K-point FFT processors 0 through 31 may perform a Fourier transform with respect to respective lines at the same time and output intermediate values. The intermediate value indicates a pixel value generated by performing a Fourier transform with respect to the frame.

The first buffer 620 sequentially stores an intermediate value output from the first core 610. The first buffer 620 stores intermediate values output from the 1K-point FFT processors 0 through 31. For example, the first buffer 620 may store 32 intermediate values sequentially output from the 1K-point FFT processors 0 through 31 and output 32 intermediate values to the memory 630. 32 intermediate values stored first indicate pixel values of the first column of intermediate data. Next, the first buffer 620 may store 32 intermediate values sequentially output from the 1K-point FFT processors 0 through 31, and 32 intermediate values stored second indicate pixel values of the second column of the intermediate value.

The memory 630 may store the intermediate data. The memory 630 sequentially stores an intermediate value output from the first buffer 620. While a description has been made of an example in which the memory 630 stores data received from the first buffer 620 in FIG. 6, the memory 630 may store data output from the second core 660.

The demultiplexer 640 reads data from the memory 630 and outputs the read data to the second buffer 650. The demultiplexer 640 reads data in a direction in which the second core 660 performs the 1D FFT. For example, when the second core 660 performs the 1D FFT in the column direction, the demultiplexer 640 may read data stored in the memory 630 in the column direction. The demultiplexer 640 outputs the read data to the second buffer 650.

The second buffer 650 may include a plurality of buffers. Each buffer outputs data to each 512-point FFT processor of the second core 660. The plurality of buffers may store one line. When the second core 660 performs the 1D FFT in the column direction, one buffer may store data included in one column. Thus, the second buffer 650 may store 32 lines.

The second core 660 may include a plurality of 512-point FFT processors. The plurality of 512-point FFT processors may perform the 1D FFT with respect to each line of the frame. According to an exemplary embodiment, the term "512-point" indicates a processor that performs the 1D FFT with respect to 512 pixel values of the frame. For example, the second core 660 may include 32 512-point FFT processors. A 512-point FFT processor 0 indicates a $0^{th}$ processor, a 512-point FFT processor 1 indicates a $1^{st}$ processor, and a 512-point FFT processor 31 indicates a $31^{st}$ processor. The 512-point FFT processor 0 performs Fourier transform with respect to a first line (or a first row) of the frame, the 512-point FFT processor 1 performs Fourier transform with respect to a second line of the frame, and the 512-point FFT processor 31 performs Fourier transform with respect to a $32^{nd}$ line of the frame. The 512-point FFT processors 0 through 31 may perform a Fourier transform with respect to respective lines at the same time and output intermediate values. The intermediate value indicates a pixel value generated by performing a Fourier transform with respect to the frame, and indicates a part of the intermediate data.

The image processing apparatus 600 may further include a plurality of operators. The plurality of operators may perform a focus term operation and a depth summation operation. The plurality of operators may be connected with 512-point processors included in the second core 660, similar to how the second buffer 650 is connected with the 512-point processors included in the second core 660. One operator sums plural data according to a depth. For example, if a depth level is 8, the operator sequentially sums 8 output lines to generate one line, thereby performing depth summation.

Figure 7:
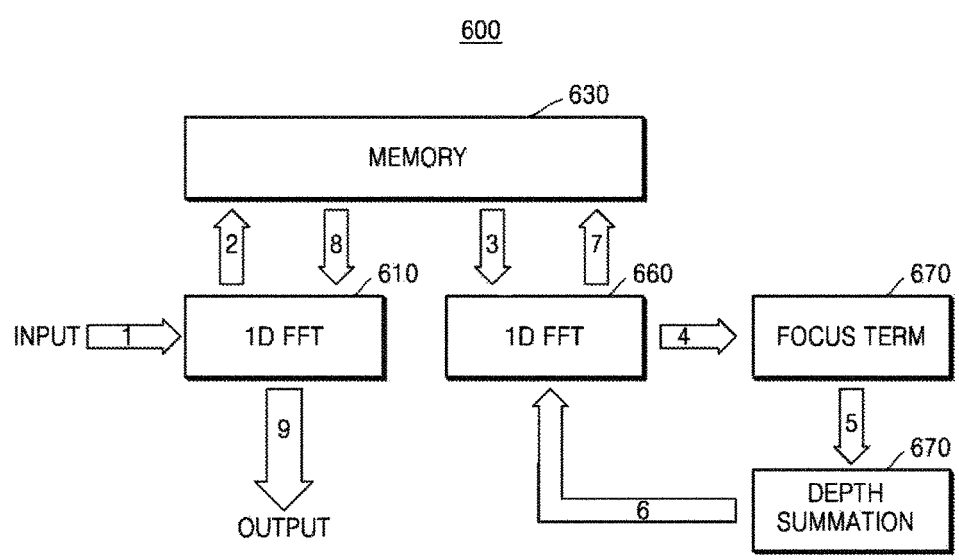
FIG. 7 is a view for describing a data processing sequence according to an exemplary embodiment.

FIG. 7 is a view for describing a data processing sequence according to an exemplary embodiment. Referring to FIG. 7, the image processing apparatus 600 performs the 2D FFT twice by using the two cores 610 and 660, and inputs the depth-summed data to the second core 660 instead of inputting the depth-summed data to the memory 630 to reduce the number of times data is stored in the memory 630.

With reference to FIG. 7, a description will be made of an example in which the first core 610 performs the 1D FFT in the row direction and the second core 660 performs the 1D FFT in the column direction.

First, data is input to the first core 610. The first core 610 performs the 1D FFT with respect to data in the row direction.

Second, the first core 610 outputs the 1D FFT-transformed data to the memory 630 through the first buffer 620.

Third, the second core 660 reads data from the memory 630 in the column direction through the demultiplexer 640 and the second buffer 650. The second core 660 performs the 1D FFT with respect to data. The second core 660 performs the 1D FFT in the column direction.

Fourth, the second core 660 outputs data to operators 670 (e.g., depth summation operator 670 and focus term operator 670).

Fifth, the operators 670 perform the focus term operation and the depth summation operation.

Sixth, the operators 670 output the depth-summed data to the second core 660.

In the exemplary embodiment of FIG. 7, when the primary 2D FFT is performed, the first core 610 performs the 1D FFT prior to the second core 660. When the secondary 2D FFT is performed, the second core 660 performs the 1D FFT prior to the first core 610. Data output from the operators 670 is data read in the column direction, and thus, when the data is output to the second core 660, the data is not necessarily stored in the memory 630 before being output. To output the data output from the operators 670 to the first core 610, the data should be read in the row direction, such that the data output from the operators 670 should be read in the row direction after being stored in the memory 630. Thus, by inputting the primary FFT-transformed data output from the second core 660 to the second core 660, a process of storing the primary FFT-transformed data in the memory 630 may be omitted.

Seventh, the second core 660 outputs the 1D FFT-transformed data to the memory 630 in the column direction. The 1D FFT-transformed data is data generated during the secondary 2D FFT.

Eighth, the first core 610 reads the data that is 1D-FFT transformed by the second core 660 from the memory 630. The first core 610 performs the 1D FFT with respect to the read data. The first core 610 performs the 1D FFT in the row direction.

Ninth, the first core 610 outputs the 2D FFT-transformed data.

Figure 8:
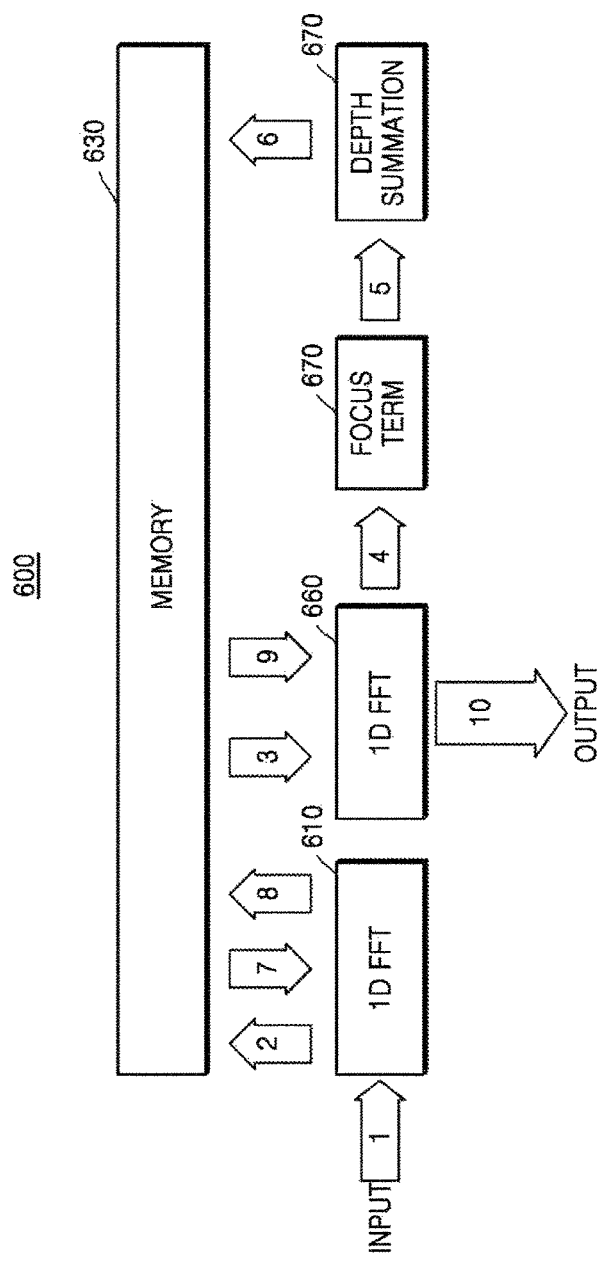
FIG. 8 is a view for describing a data processing sequence according to another exemplary embodiment.

FIG. 8 is a view for describing a data processing sequence according to another exemplary embodiment. Referring to FIG. 8, the image processing apparatus 600 performs the 2D FFT twice by using the two cores 610 and 660, and stores the depth-summed data in the memory 630 unlike in FIG. 7.

With reference to FIG. 8, a description will be made of an example in which the first core 610 performs the 1D FFT in the row direction and the second core 660 performs the 1D FFT in the column direction.

First, data is input to the first core 610. The first core 610 performs the 1D FFT with respect to data in the row direction.

Second, the first core 610 outputs the 1D FFT-transformed data to the memory 630.

Third, the second core 660 reads data from the memory 630 in the column direction. The second core 660 performs the 1D FFT with respect to the read data. The second core 660 performs the 1D FFT in the column direction.

Fourth, the second core 660 outputs data to operators 670 (e.g., focus term operator 670 and depth summation operator 670).

Fifth, the operators 670 perform the focus term operation and the depth summation operation.

Sixth, the operators 670 output the depth-summed data to the memory 630.

Seventh, the first core 610 reads data from the memory 630 in the row direction. The first core 610 performs the 1D FFT with respect to the read data.

Eighth, the first core 610 outputs the transformed data to the memory 630.

Ninth, the second core 660 reads the data that is 1D-FFT transformed by the first core 610 from the memory 630. The second core 660 performs the 1D FFT with respect to the read data. The first core 610 performs the 1D FFT in the column direction.

Tenth, the second core 660 outputs the 2D FFT-transformed data.

Figure 9:
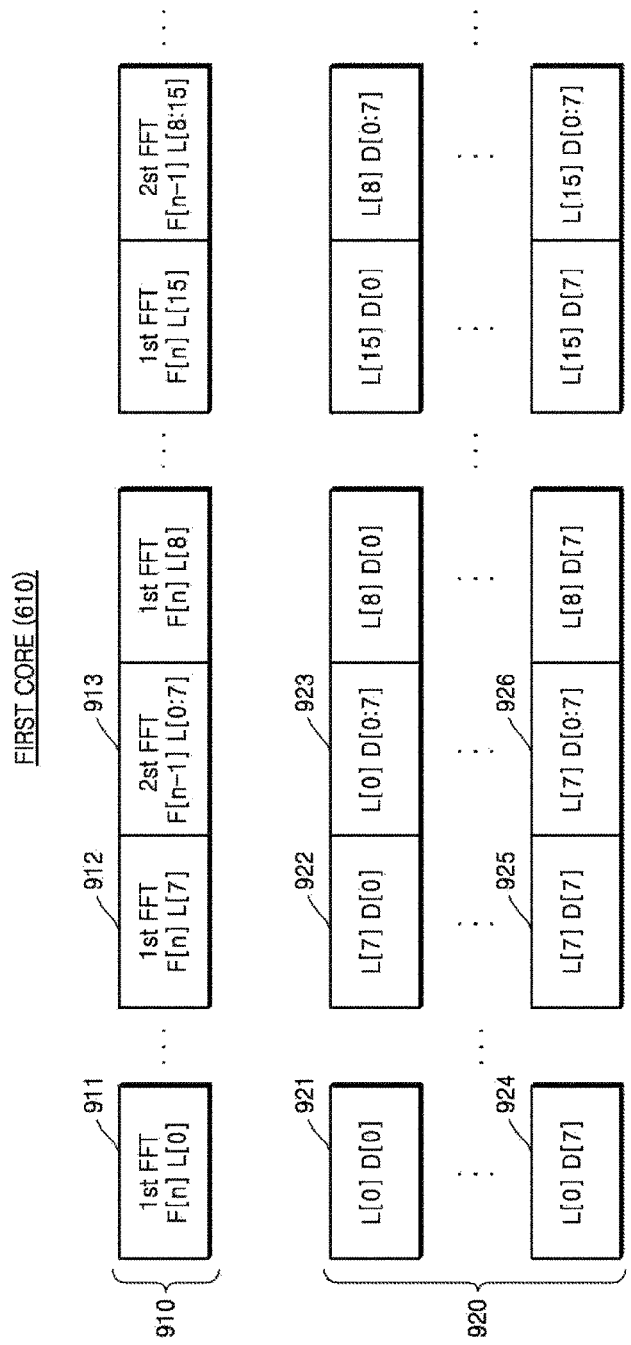
FIG. 9 is a timing example of data input to a first core according to an exemplary embodiment.

FIG. 9 is a timing example of data input to a first core according to an exemplary embodiment. The first core 610 processes data as shown in FIG. 9 to reduce a delay time. With reference to FIG. 9, a description will be made of an example in which the first core 610 includes 8 1D FFT processors.

Reference numeral 910 indicates a sequence of data, and reference numeral 920 indicates a structure of detailed data in the sequence 910. The $1^{st}$ FFT may be an FFT from a pupil to a retina, and the $2^{nd}$ FFT may be an FFT from a panel to the pupil. F[n] indicates an $n^{th}$ frame, and F[n−1] indicates an $(n−1)^{th}$ frame. L[0] indicates a $0^{th}$ line. Thus, F[n]L[0] indicates a $0^{th}$ line of an $n^{th}$ frame. When the first core 610 performs the 1D FFT in the row direction, L[0] indicates a $0^{th}$ row. L[0:7] indicates lines from the $0^{th}$ line to a $7^{th}$ line. Reference numerals 911, 912, and 913 indicate data processed during one time period, respectively. The $n^{th}$ line may include a plurality of lines according to a depth level. For example, if a depth level is 10, L[0] may include 10 lines according to a depth.

The first core 610 processes the current frame and a previous frame by performing time division. That is, the first core 610 alternately performs the primary FFT with respect to the current frame and the secondary FFT with respect to the previous frame. For example, the first core 610 may perform the 1D FFT with respect to the $n^{th}$ frame during a $1^{st}$ time period to an $8^{th}$ time period, and perform the 1D FFT with respect to an $(n−1)^{th}$ frame during a $9^{th}$ time period. The 1D FFT with respect to the $n^{th}$ frame is the primary 1D FFT, and the 1D FFT with respect to the $(n−1)^{th}$ frame is the secondary 1D FFT.

During the $1^{st}$ through $8^{th}$ time periods (a total of 8 time periods), the first core 610 performs the primary 1D FFT with respect to a $0^{th}$ line 911 through a $7^{th}$ line 912 of the $n^{th}$ frame. If the first core 610 includes 8 1D FFT processors, the first core 610 performs the primary 1D FFT with respect to the $0^{th}$ line 921 of a $0^{th}$ depth through the $0^{th}$ line 924 of a $7^{th}$ depth during the $1^{st}$ time period. The first core 610 performs the 1D FFT with respect to 8 depths of one line during the $1^{st}$ time period. The first core 610 performs the primary 1D FFT with respect to a $1^{st}$ line of a $0^{th}$ depth through a $1^{st}$ line of a $7^{th}$ depth during the $2^{nd}$ time period. The first core 610 performs the primary 1D FFT with respect to a $7^{th}$ line 922 of the $0^{th}$ depth through a $7^{th}$ line 925 of the $7^{th}$ depth during the $8^{th}$ time period.

The first core 610 performs the primary 1D FFT with respect to a $0^{th}$ line 923 through a $7^{th}$ line 926 of the $(n-1)^{th}$ frame during the $9^{th}$ time period. The $0^{th}$ line 923 through the $7^{th}$ line 926 are depth-summed lines. For example, the line 923 may be generated by summing $0^{th}$ through $7^{th}$ depth data with respect to the $0^{th}$ line. D[0:7] indicates the depth-summed data.

As illustrated in FIG. 9, the first core 610 processes data with respect to two frames through time division to reduce a time between the completion of Fourier transform with respect to the $(n-1)^{th}$ frame and the completion of Fourier transform with respect to the $n^{th}$ frame.

Figure 10:
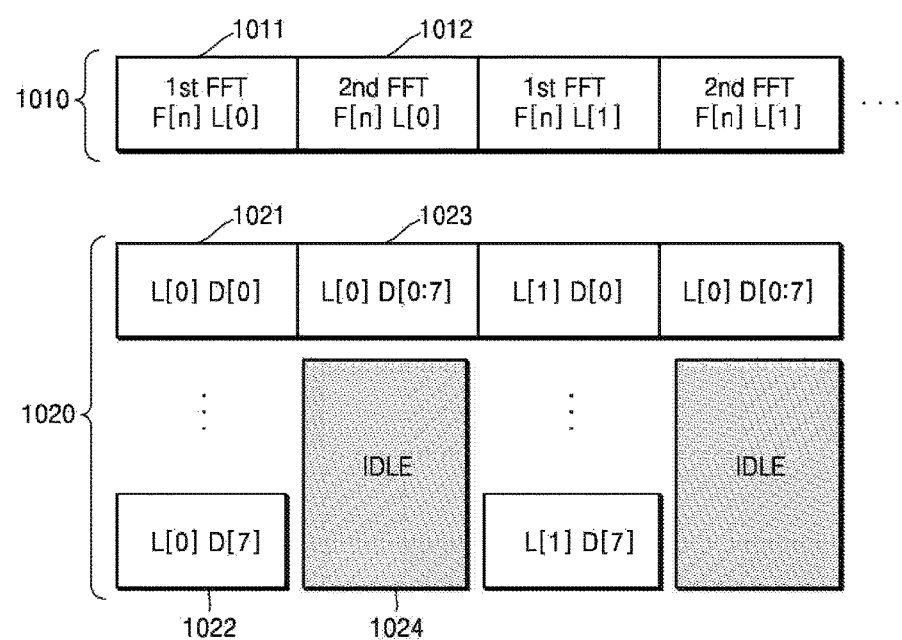
FIG. 10 is a timing example of data input to a second core according to an exemplary embodiment.

FIG. 10 is a timing example of data input to a second core according to an exemplary embodiment. The second core 660 processes data as shown in FIG. 10 to reduce a time needed to store and read the data in and from the memory 630. The second core 660 alternately performs the primary FFT with respect to the current frame and the secondary FFT with respect to the current frame. With reference to FIG. 10, a description will be made of an example in which the second core 660 includes 8 1D FFT processors.

Reference numeral 1010 indicates a sequence of data, and reference numeral 1020 indicates a structure of detailed data in the sequence 1010. The second core 660, unlike the first core 610, may perform the 1D FFT with respect to the current frame.

During the $1^{st}$ time period, the second core 660 processes lines 1021 through 1022 for a total of 8 depths. If the second core 660 includes 16 1D FFT processors, the second core 660 may simultaneously process a total of 16 lines during the $1^{st}$ time period.

The second core 660 performs the primary 1D FFT with respect to the $0^{th}$ line 1011 of the $n^{th}$ frame during the $1^{st}$ time period. The line 1011 includes the lines 1021 through 1022 for the total of 8 depths. Thus, during the $1^{st}$ time period, the second core 660 performs the primary 1D FFT with respect to the 8 lines 1021 through 1022 at the same time.

The second core 660 performs the secondary 1D FFT with respect to the $0^{th}$ line 1012 of the $n^{th}$ frame during the $2^{nd}$ time period. The $0^{th}$ line 1012 is depth-summed data and includes one line 1023. Thus, the line 1023 is processed by the 1D FFT processor, and the other 1D FFT processors are in an idle state.

After the transformed data is depth-summed during the $1^{st}$ time period, the depth-summed data is input to the second core 660 during the $2^{nd}$ time period, thereby omitting the process of storing and reading the data in and from the memory 630. If the first core 610 performs the 1D FFT in the row direction and the second core 660 performs the 1D FFT in the column direction, data transformed by the second core 660 should be read in the row direction after being stored in the memory 630 so as to be input to the first core 610, but the data transformed by the second core 660 is located in the same column and thus may be input to the second core 660 without being stored in the memory 630.

Figure 11:
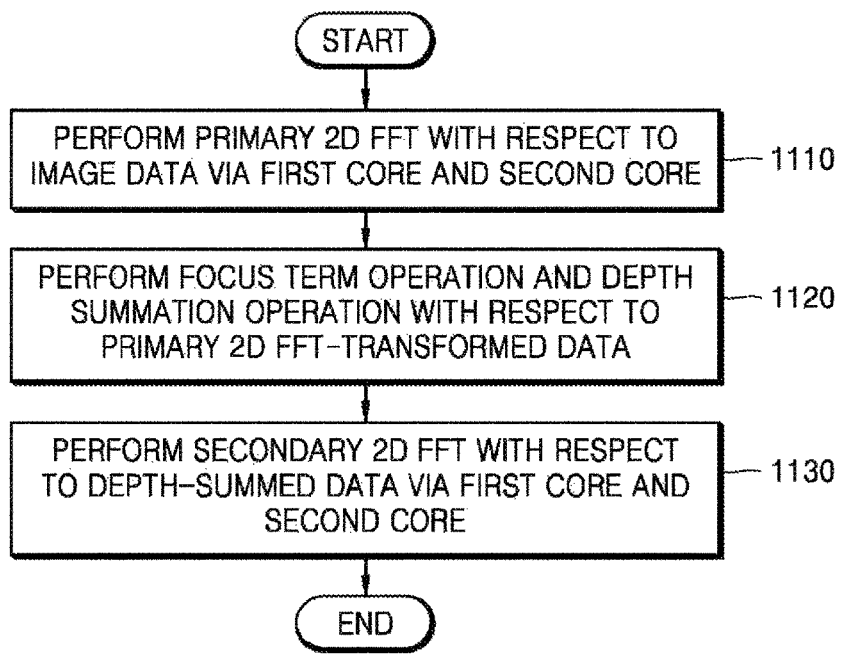
FIG. 11 is a flowchart illustrating an image processing method according to an exemplary embodiment.

FIG. 11 is a flowchart illustrating an image processing method according to an exemplary embodiment. Referring to FIG. 11, the image processing apparatus 600 may perform the primary 2D FFT and the secondary 2D FFT via the first core 610 and the second core 660. The first core 610 may perform the 1D FFT in the row direction, and the second core 660 may perform the 1D FFT in the column direction. In another exemplary embodiment, the first core 610 may perform the 1D FFT in the column direction, and the second core 660 may perform the 1D FFT in the row direction.

In operation 1110, the first core 610 and the second core 660 may perform the primary 2D FFT and the secondary 2D FFT with respect to image data. The first core 610 may perform the primary 1D FFT with respect to the image data, and the second core 660 may perform the primary 1D FFT with respect to the data transformed by the first core 610.

The first core 610 may read the image data in the row direction and performs the 1D FFT with respect to each line read in the row direction. The data transformed by the first core 610 may be stored in the memory 630 and may be read by the controller 510 in the column direction. The controller 510 may input the read data to the second core 660. The second core 660 may perform the 1D FFT with respect to each line read in the column direction.

In operation 1120, the image processing apparatus 600 may perform the focus term operation and the depth summation operation with respect to the primary 2D FFT-transformed data. The primary 2D FFT-transformed data is data in the column direction of the frame and may be output from the second core 660.

In operation 1130, the first core 610 and the second core 660 may perform the secondary 2D FFT with respect to the depth-summed data. The second core 660 may perform the 1D FFT with respect to the depth-summed data. The data output from the second core 660 may be stored in the memory 630. The controller 510 may read the data output from the second core 660, which is stored in the memory 630. The controller 510 may input the read data in the first core 610. The first core 610 may perform the 1D FFT with respect to the input data.

According to aspects of certain exemplary embodiments, a Fourier transform may be performed by using a small number of cores.

Furthermore, according to aspects of certain exemplary embodiments, a data processing sequence may be controlled to prevent a delay in a data processing process performed after the Fourier transform.

An apparatus according to certain exemplary embodiments may include a processor, a memory for storing program data and executing the program data, a permanent storage such as a disk drive, a communications port for communicating with external devices, and user interface devices, such as a touch panel, a key, a button, etc. Methods according to exemplary embodiments may be implemented with a software module or algorithm that may be stored as computer-readable codes or program instructions executable on the processor on computer-readable recording media. Examples of the computer-readable recording media may include a magnetic storage medium (e.g., read-only memory (ROM), random-access memory (RAM), floppy disk, hard disk, etc.) and an optical medium (e.g., a compact disc-ROM (CD-ROM), a digital versatile disc (DVD), etc.), and so forth. The computer-readable recording medium may be distributed over network coupled computer systems so that a computer-readable code is stored and executed in a distributed fashion. The medium may be read by a computer, stored in a memory, and executed by a processor.

Certain exemplary embodiments may be represented by block components and various process operations. Such functional blocks may be implemented by various numbers of hardware and/or software components which perform specific functions. For example, certain exemplary embodiments may employ various integrated circuit components, e.g., memory elements, processing elements, logic elements, look-up tables, and the like, which may carry out a variety of functions under the control of one or more microprocessors or other control devices. Similarly, where the elements of certain exemplary embodiments are implemented using software programming or software elements, the exemplary embodiments may be implemented with any programming or scripting language such as C, C++, Java, assembler, or the like, with the various algorithms being implemented with any combination of data structures, objects, processes, routines or other programming elements. Functional aspects may be implemented as an algorithm executed in one or more processors. Furthermore, the exemplary embodiments may employ any number of conventional techniques for electronics configuration, signal processing and/or control, data processing and the like. The terms "mechanism", "element", "means", or "component" are used broadly and are not limited to mechanical or physical exemplary embodiments. The terms may include a series of routines of software in conjunction with a processor or the like.

Particular executions described in the current exemplary embodiments are merely examples, and do not limit a technical range with any method. For the sake of brevity, conventional electronics, control systems, software development and other functional aspects of the systems may not be described in detail. Furthermore, the connecting lines, or connectors shown in the various presented figures, are intended to represent exemplary functional relationships and/or physical or logical couplings between the various elements.

According to certain exemplary embodiment, the use of the term "the" and other demonstratives similar thereto may correspond to both the singular form and the plural form. Also, if a range is described in certain exemplary embodiments, the range should be regarded as including exemplary embodiments adopting any individual element within the range (unless described otherwise), and also, should be regarded as having written in the detailed description of the disclosure each individual element included in the range. Unless the order of operations of a method is explicitly mentioned or described otherwise, the operations may be performed in many different orders and are not limited to any particular order. The use of all examples or exemplary terms (e.g., "etc.,", "and (or) the like", and "and so forth") is merely intended to describe the technical spirit in detail, and the scope is not limited by the examples or exemplary terms unless defined by the claims. Also, one of ordinary skill in the art may appreciate that the exemplary embodiments may be configured through various modifications, combinations, and changes according to design conditions and factors without departing from the spirit and technical scope of the exemplary embodiments and equivalents thereof.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An image processing apparatus configured to perform a two-dimensional (2D) fast Fourier transform (FFT) with respect to image data, the image processing apparatus comprising:

a first core and a second core, each of the first core and the second core comprising a plurality of processors configured to perform a primary 2D FFT and a secondary 2D FFT with respect to the image data by repeatedly performing a one-dimensional (1D) FFT;

a memory configured to store data output from the first core and the second core;

a depth summation operator; and a focus term operator, wherein the first core is configured to perform the 1D FFT of the primary 2D FFT with respect to the image data in a first one of a row direction and a column direction and output the 1D FFT-transformed data to the memory, wherein the second core is configured to read the 1D-FFT transformed data from the memory, perform the 1D FFT of the primary 2D FFT with respect to the 1D-FFT transformed data in a second one of the row direction and the column direction that is different from the first one of the row direction and the column direction, and output the 1D-FFT transformed data to the focus term operator, wherein the focus term operator performs a focus term operation on the 1D-FFT transformed data and the depth summation operator performs a depth summation operation on the 1D-FFT transformed data, and the focus term operator and the depth summation operator output the depth-summed image data directly to the second core, wherein the second core performs the 1D FFT of the secondary 2D FFT on the depth-summed image data in the second one of the row direction and the column direction and outputs the 1D FFT-transformed data to the memory, wherein the first core reads the 1D FFT-transformed data from the memory and performs the 1D FFT of the secondary 2D FFT on the 1D FFT-transformed data in the first one of the row direction and the column direction, and wherein the focus term operator and the depth summation operator are configured to perform the focus term operation and the depth summation operation to generate the depth-summed image data by arranging primary 2D FFT-transformed data generated by the first core and the second core into a plurality of lines having a predetermined depth level and sequentially summing a subset of the plurality of lines, wherein a number of lines included in the subset is equal to the predetermined depth level.

2. The image processing apparatus of claim 1, wherein the first core is configured to alternately perform the primary 2D FFT with respect to a current frame of the image data and the secondary 2D FFT with respect to the current frame.

3. The image processing apparatus of claim 1, wherein the second core is configured to alternately perform the primary 2D FFT with respect to a current frame of the image data and the secondary 2D FFT with respect to the current frame.

4. The image processing apparatus of claim 1, wherein the first core is configured to perform the 1D FFT in a row direction, and the second core is configured to perform the 1D FFT in a column direction.

5. The image processing apparatus of claim 1, wherein the first one of the row direction and the column direction is the column direction, and the second one of the row direction and the column direction is the row direction.

6. An image processing method of performing two-dimensional (2D) fast Fourier transform (FFT) with respect to image data, the image processing method comprising:

performing, by a first core and a second core, a primary 2D FFT with respect to the image data to generate primary 2D FFT-transformed data;

generating depth-summed data by arranging primary 2D FFT-transformed data generated by the first core and the second core into a plurality of lines having a predetermined depth level and sequentially summing a subset of the plurality of lines, wherein a number of lines included in the subset is equal to the predetermined depth level;

outputting the depth-summed data directly to the second core; and performing, by the first core and the second core, a secondary 2D FFT with respect to the depth-summed data.

7. The image processing method of claim 6, wherein the performing of the 2D FFT comprises:

inputting the depth-summed data to the second core, and performing, by the second core, a one-dimensional (1D) FFT with respect to the depth-summed data to generate 1D FFT-transformed data;

storing the 1D FFT-transformed data generated by the second core in a memory; and reading the stored data from the memory, inputting the read data to the first core, and performing, by the first core, the 1D FFT with respect to the input data.

8. The image processing method of claim 6, wherein the performing of the 2D FFT comprises:

storing the depth-summed data in a memory;

reading the depth-summed data from the memory, inputting the read data to the first core, and performing, by the first core, a 1D FFT with respect to the input data to generate 1D FFT-transformed data;

storing the 1D FFT-transformed data generated by the first core in a memory; and reading the stored data from the memory, inputting the read data to the second core, and performing, by the second core, the 1D FFT with respect to the input data.

9. The image processing method of claim 6, further comprising alternately performing, by the first core, the primary 2D FFT with respect to a current frame of the image data and the secondary 2D FFT with respect to the current frame.

10. The image processing method of claim 6, further comprising alternately performing, by the second core, the primary 2D FFT with respect to a current frame of the image data and the secondary 2D FFT with respect to the current frame.

11. The image processing method of claim 6, wherein the first core performs a one-dimensional (1D) FFT in a row direction, and the second core performs the 1D FFT in a column direction.

12. The image processing method of claim 6, wherein the first core performs a one-dimensional (1D) FFT in a column direction, and the second core performs the 1D FFT in a row direction.

13. A non-transitory computer-readable recording medium having recorded thereon a program which, when executed, causes an image processing apparatus to perform an image processing method comprising:

performing, by a first core and a second core, a primary two-dimensional (2D) fast Fourier transform (FFT) with respect to image data to generate primary 2D FFT-transformed data;

generating depth-summed data by arranging primary 2D FFT-transformed data generated by the first core and the second core into a plurality of lines having a predetermined depth level and sequentially summing a subset of the plurality of lines, wherein a number of lines included in the subset is equal to the predetermined depth level;

outputting the depth-summed data directly to the second core; and performing, by the first core and the second core, a secondary 2D FFT with respect to the depth-summed data.

* * * * *